ROSS & WEST.
Tobacco Pipe and Cigar Holder.
No. 56,272.  Patented July 10, 1866.
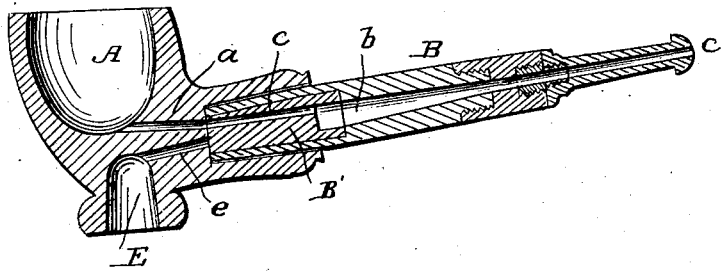
Witnesses:
Inventors:

UNITED STATES PATENT OFFICE.

G. M. ROSS AND WM. H. WEST, OF NEW YORK, N. Y.

TOBACCO-PIPE AND CIGAR-HOLDER.

Specification forming part of Letters Patent No. 56,272, dated July 10, 1866.

*To all whom it may concern:*

Be it known that we, G. M. Ross and WM. H. WEST, of the city, county, and State of New York, have invented a new and Improved Tobacco-Pipe and Cigar-Holder Combined; and we do hereby declare that the following is a full, clear, and exact description thereof, which will enable others skilled in the art to make and use the same.

This invention consists in a tobacco-pipe having a cigar-holder combined therewith in such a manner that the article is available as a tobacco-pipe or cigar-holder, and also in a novel construction of stem to check the flow of the nicotine liquid through the same, as hereinafter explained, reference being had to the accompanying drawing, forming part of this specifiation.

The drawing shows a vertical longitudinal section of our improved pipe and cigar-holder, in which A is the pipe-bowl, having a cigar-holding socket, E, combined therewith, and both mounted in one piece.

B is the stem, having a cavity or enlargement of bore at $b$, as shown, to catch the liquid nicotine and prevent its passing through with the smoke to the mouth of the smoker. This chamber $b$ is formed by making a large bore in the lower end of stem B, and then closing the large bore at the said lower end of stem B by a cork plug, B', which has a bore, $c$, of the usual size for the passage of smoke, and by this means the enlarged cavity $b$ is formed in the stem in an inexpensive and simple manner. The bore $c$ in the cork or plug B' is placed eccentrically therein, or nearest to its upper side, and the pipe $t$ and holder E have each a smoke bore or conduit, $a$ and $e$, which are so located with relation to the eccentrically-located smoke-passage $c$ in the plug B' that when the pipe is turned around on the stem B' B so as to be up and in position for use, then its smoke-passage $a$ is in communication with the passage $c$, and the smoke-passage $e$ of the cigar-socket is out of connection with passage $c$, as shown; but when the bowl A is turned on the stem B' B so as to be under and the cigar-holding socket up in position for use, then the passage $a$ is out of connection with $c$, and the smoke-passage $e$ of the cigar-holder E is in communication with the smoke-passage $c$ in the stem B' B.

By these means we combine the cigar-holder and pipe, and produce the two devices in a simplified and convenient form, and also construct a nicotine cavity or chamber in a more simple manner than heretofore.

Having thus described our invention, what we claim as new, and desire to secure by Letters Patent, is—

1. The combination of the pipe A and cigar socket or holder E, substantially in the manner and for the purpose specified.

2. The enlargement $b$ of the bore or smoke-passage $c c$ of the stem B, as and for the purpose herein specified.

GEORGE M. ROSS.
WM. H. WEST.

Witnesses:
WM. F. MCNAMARA,
ALEX. F. ROBERTS.